US011314413B2

(12) United States Patent
Brettell et al.

(10) Patent No.: US 11,314,413 B2
(45) Date of Patent: Apr. 26, 2022

(54) ADJUSTABLE TAPE STORAGE CAPACITY

(71) Applicant: International Business Machines Corporation, Armonk, NY (US)

(72) Inventors: David A. Brettell, Vail, AZ (US); Alan J. Fisher, Tucson, AZ (US); Duke A. Lee, Tucson, AZ (US); Alexander Nieves, Chandler, AZ (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 15/096,962

(22) Filed: Apr. 12, 2016

(65) Prior Publication Data

US 2017/0293433 A1 Oct. 12, 2017

(51) Int. Cl.
*G06F 3/06* (2006.01)

(52) U.S. Cl.
CPC .......... *G06F 3/0607* (2013.01); *G06F 3/0631* (2013.01); *G06F 3/0686* (2013.01)

(58) Field of Classification Search
CPC ..... G06F 3/0607; G06F 3/0631; G06F 3/0686
See application file for complete search history.

(56) References Cited

U.S. PATENT DOCUMENTS

| 7,437,492 | B2 | 10/2008 | Stager et al. | |
|---|---|---|---|---|
| 7,761,284 | B2 * | 7/2010 | Matze | G06F 3/0605 |
| | | | | 703/23 |
| 7,809,917 | B2 | 10/2010 | Burton | |
| 7,835,900 | B2 | 11/2010 | Slater et al. | |
| 8,260,893 | B1 * | 9/2012 | Bandhole | G06F 9/5083 |
| | | | | 709/221 |
| 8,620,640 | B2 | 12/2013 | Sandorfi et al. | |
| 8,880,801 | B1 * | 11/2014 | Robins | G06F 12/0246 |
| | | | | 711/114 |
| 10,082,959 | B1 * | 9/2018 | Chen | G06F 3/0608 |

(Continued)

OTHER PUBLICATIONS

"A method for changing data cache size dynamically during read operation to avoid wrap turn effect on tape file system", Mar. 11, 2014, An IP.com Prior Art Database Technical Disclosure, IP.com No. IPCOM000235593D, 2 pages, <http://ip.com/IPCOM/000235593>.

(Continued)

*Primary Examiner* — Sanjiv Shah
*Assistant Examiner* — Alexander J Yoon
(74) *Attorney, Agent, or Firm* — William H. Hartwell; Maeve M. Carpenter

(57) ABSTRACT

A tool for adjusting available physical tape storage capacities. The tool determines an initial capacity size for one or more tapes, wherein the initial capacity size is a maximum physical storage capacity provided by the one or more tapes. The tool assigns the one or more tapes to a logical cluster based, at least in part, on the initial capacity size for the one or more tapes. The tool determines an initial storage capacity for the one or more tapes, wherein the initial storage capacity is a starting logical storage capacity that is less than the maximum physical storage capacity provided by the one or more tapes. The tool determines an incremental growth threshold for the one or more tapes. Responsive to a determination that the incremental growth threshold is exceeded, the tool increments a logical storage capacity of the one or more tapes by an incremental growth assignment.

14 Claims, 3 Drawing Sheets

(56) References Cited

U.S. PATENT DOCUMENTS

| | | | | |
|---|---|---|---|---|
| 2002/0129216 A1* | 9/2002 | Collins | ................ | G06F 3/0608 |
| | | | | 711/170 |
| 2003/0135580 A1* | 7/2003 | Gamble | ............... | G06F 3/0608 |
| | | | | 709/216 |
| 2005/0050263 A1* | 3/2005 | Ashton | ............. | G11B 27/3027 |
| | | | | 711/111 |
| 2008/0126257 A1* | 5/2008 | Ballard | ................. | G06Q 30/06 |
| | | | | 705/59 |
| 2009/0254468 A1* | 10/2009 | Acedo | .................. | G06F 3/0605 |
| | | | | 705/35 |
| 2011/0320679 A1* | 12/2011 | Ashton | .................. | G06F 12/02 |
| | | | | 711/4 |
| 2014/0164581 A1* | 6/2014 | Park | ................... | G06F 11/3034 |
| | | | | 709/221 |
| 2016/0127200 A1* | 5/2016 | Dippenaar | ............ | G06F 3/0605 |
| | | | | 709/224 |
| 2017/0177224 A1* | 6/2017 | Glover | ................. | G06F 3/0604 |

OTHER PUBLICATIONS

IBM, "Method and Apparatus for Providing "On-Demand" Physical Tape Capacity", May 10, 2008, An IP.com Prior Art Database Technical Disclosure, IP.com No. IPCOM000170160D, 2 pages, <http://ip.com/IPCOM/000170160>.

IBM, "Space efficient high availability in automated tape libraries", Apr. 19, 2007, An IP.com Prior Art Database Technical Disclosure, IP.com No. IPCOM000150664D, 5 pages, <http://ip.com/IPCOM/000150664>.

\* cited by examiner

… (1)

ADJUSTABLE TAPE STORAGE CAPACITY

BACKGROUND OF THE INVENTION

The present invention relates generally to big data tape management and more particularly to adjusting available storage capacity of a physical tape.

Mainframe virtual tape solutions may support enterprise tape storage. These mainframe virtual tape solutions may include a tape volume cache (TVC) where logical volumes may be written to or read by one or more attached host systems through attachment to tape drives installed in tape libraries. Some mainframe virtual tape solutions may be attached to a physical library, allowing logical volumes to be copied or moved to a physical tape. Logical volumes may be stacked to the physical tape until the tape storage capacity is filled, at which point the mainframe virtual tape solutions may mark the physical tape volume as full in a database to stop appending additional data.

Physical tape sizes continue to grow. Currently, up to 10 terabytes (TB) of compressed host data can be written to a single physical tape, where the physical tapes come in various media types, such as a long cartridge or a short cartridge.

SUMMARY

Aspects of an embodiment of the present invention disclose a method, a computer system and a computer program product for adjusting available physical tape storage capacities, in accordance with an embodiment of the present invention. The method includes determining, by one or more computer processors, an initial capacity size for one or more tapes, wherein the initial capacity size is a maximum physical storage capacity provided by the one or more tapes. The method includes assigning, by the one or more computer processors, the one or more tapes to a logical cluster based, at least in part, on the initial capacity size for the one or more tapes. The method includes determining, by the one or more computer processors, an initial storage capacity for the one or more tapes, wherein the initial storage capacity is a starting logical storage capacity that is less than the maximum physical storage capacity provided by the one or more tapes. The method includes determining, by the one or more computer processors, an incremental growth threshold for the one or more tapes. In response to a determination that the incremental growth threshold is exceeded, the method includes incrementing, by the one or more computer processors, a logical storage capacity of the one or more tapes by an incremental growth assignment.

DETAILED DESCRIPTION

Embodiments of the present invention recognize that host applications that attach to a tape visualization engine have no direct control over the capacity of a tape cartridge. Embodiments of the present invention further recognize that once the tape visualization engine selects a tape cartridge to stack logical volumes to, the tape visualization engine writes data to the tape cartridge until maximum capacity is reached. Embodiments of the present invention further recognize that a long tape cartridge can stack five times the amount of compressed host data than a short tape cartridge, however, accessing the host data on the long tape cartridge generally takes much longer when compared to the short tape cartridge. Embodiments of the present invention further recognize that where a customer demands expeditious data access, both long cartridges and short cartridges must be purchased.

Embodiments of the present invention provide the capability to dynamically manage the logical capacity of a physical tape by adjusting the physical tape size using a virtual maximum capacity on the physical tape that will dynamically increment the maximum storage capacity based on predefined storage policies. Embodiments of the present invention further allow a user to purchase a single media type, usually the largest in physical capacity, and allows for a logical library capacity to expand without having to increase the physical cells of the library to accommodate more tape cartridges. Embodiments of the present invention further provide the capability to offer a user flexibility in expanding physical tape storage, by allowing the use of higher capacity storage tapes by initially setting a starting capacity and gradually expanding storage capacity as storage demands grow. Embodiments of the present invention further provide the capability to optimize read and write times and data accessibility with a dynamically adjusting physical tape size. Embodiments of the present invention further provide the capability to significantly reduce mount and seek times by placing a virtual maximum capacity on high performance tapes that is less than the full capacity of the tape, such that data is stored across multiple tapes within a predefined limited capacity, instead of relying on a single tape containing a large quantity of data.

Implementation of such embodiments may take a variety of forms, and exemplary implementation details are discussed subsequently with reference to the Figures.

Figure 1:
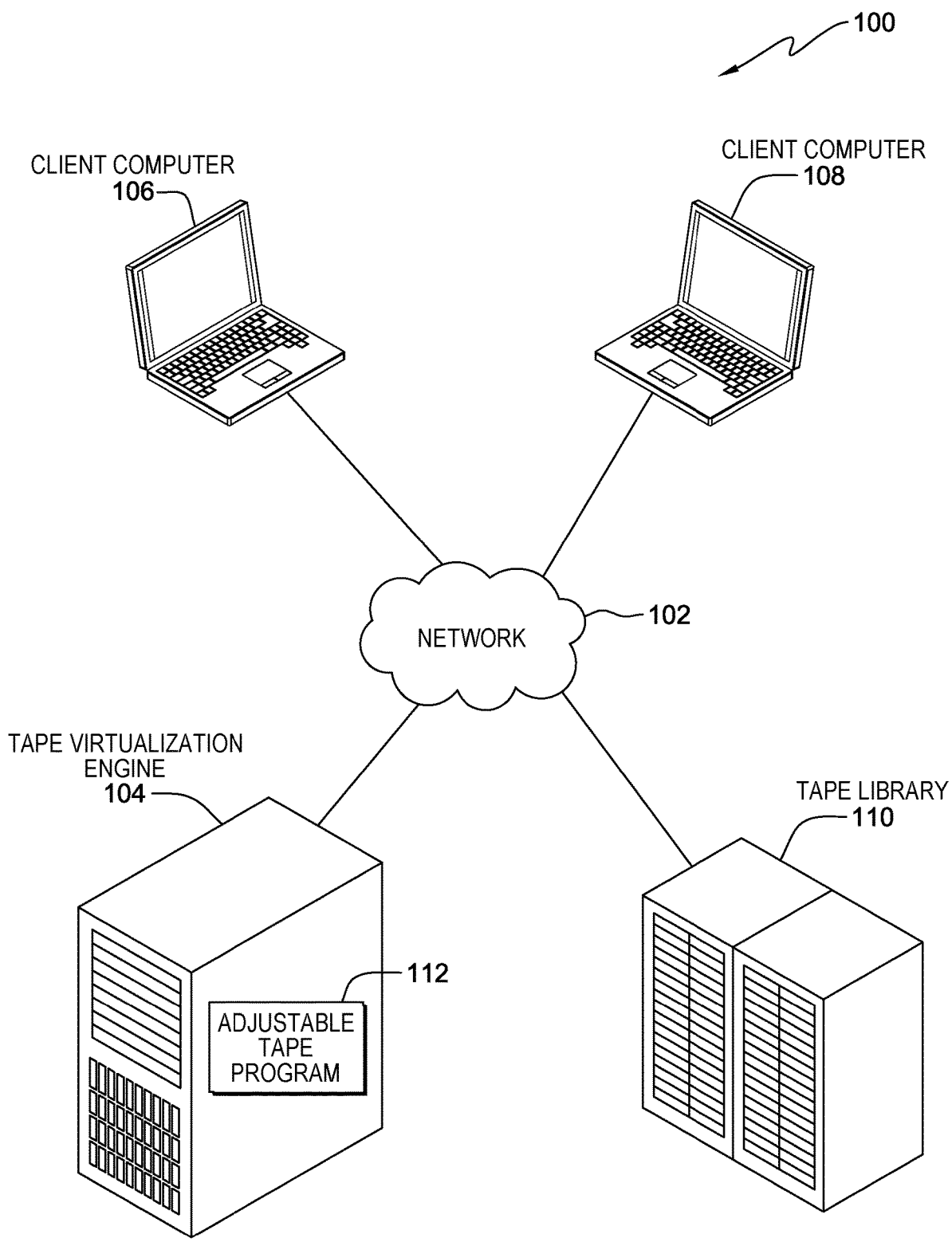
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes network 102, tape virtualization engine 104, one or more host computers, such as client computer 106 and client computer 108 and tape library 110.

In one embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Tape virtualization engine 104, client computer 106, client computer 108 and tape library 110 are interconnected by network 102. Network 102 can be any combination of connections and protocols capable of supporting communications between tape virtualization engine 104, client computer 106, client computer 108, tape library 110 and adjustable tape program 112. Network 102 may also be implemented as a number of different types of networks, such as an intranet, a local area network (LAN), a virtual local area network (VLAN), or a wide area network (WAN). FIG. 1 is intended as an example and not as an architectural limitation for the different embodiments.

In one embodiment, tape virtualization engine 104 may be, for example, a server computer system, such as a database management server, a management server, database server, a web server, a structured query language server or any other electronic device or computing system capable of sending and receiving data. In one embodiment, tape virtualization engine 104 may be a mainframe virtual tape solution that optimizes data protection and business continuance. In one embodiment, tape virtualization engine 104 may write data by policy to physical tape storage utilizing high performance tape drives installed in a tape library, such as tape library 110. In one embodiment, tape virtualization engine 104 may provide a tiered storage hierarchy of disk and tape storage caches. In another embodiment, tape virtualization engine 104 may be a data center consisting of a collection of networks and servers providing an IT service, such as virtual servers and applications deployed on virtual servers, to an external party. In one embodiment, tape virtualization engine 104 may be a database server operating on a legacy system, such as a mainframe system. In another embodiment, tape virtualization engine 104 represents a "cloud" of computers interconnected by one or more networks, where tape virtualization engine 104 is a computing system utilizing clustered computers and components to act as a single pool of seamless resources when accessed through network 102. This is a common implementation for data centers in addition to cloud computing applications. In the one embodiment, tape virtualization engine 104 includes adjustable tape program 112 for adjusting physical tape storage capacities based on predetermined storage policies.

In one embodiment, adjustable tape program 112 operates on a central server, such as tape virtualization engine 104 and may be utilized by one or more client computers, such as client computer 106 and client computer 108, via network 102. In another embodiment, adjustable tape program 112 may be a software-based program downloaded from the central server or a third-party provider (not shown), and executed on a client computer, such as client computer 106 and client computer 108, to adjust physical tape storage capacities based on predetermined storage policies. In another embodiment, adjustable tape program 112 may be a software-based program, downloaded from a central server (not shown) and installed on one or more client devices, such as client computer 106 and client computer 108. In yet another embodiment, adjustable tape program 112 may be utilized as a software service provided by a third-party cloud service provider (not shown). In yet another embodiment, adjustable tape program 112 may include one or more software-based components, such as add-ons, plug-ins, and agent programs, etc., installed on one or more client devices, such as client computer 106 and client computer 108, to adjust physical tape storage capacities based on predetermined storage policies.

In one embodiment, adjustable tape program 112 is a software-based program for adjusting physical tape storage capacities based on predetermined storage policies. In one embodiment, adjustable tape program 112 provides a mechanism for dynamically managing logical storage capacity of one or more physical tapes based on predefined storage polices. In one embodiment, adjustable tape program 112 allows a logical library capacity to expand without having to increase physical tape cells of a tape library to accommodate more tape cartridges. In one embodiment, adjustable tape program 112 provides a mechanism for logically and dynamically adjusting the tape storage capacity of a physical tape independent of the maximum physical storage capacity of the physical tape cartridge. In one embodiment, adjustable tape program 112 provides a mechanism for using higher storage capacity tapes by initially setting a starting storage capacity and gradually expanding storage capacity as storage demands grow. In one embodiment, adjustable tape program 112 provides performance gains in read and write times by placing a maximum logical capacity on a physical tape independent of actual maximum storage capacity, and temporarily marks the physical tape as full, although the maximum storage capacity of the physical tape has not been fully utilized, thereby reducing mount and seek times through the use of a predefined limited storage capacity. In one embodiment, adjustable tape program 112 dynamically alters a virtual tape size associated with a physical tape based, at least in part, on a set of predefined storage policies (e.g., storage conditions), such that when a storage condition is met, the virtual tape size is adjusted to expand storage capacity to satisfy data storage requirements.

In one embodiment, client computer 106 and client computer 108 are clients to tape virtualization engine 104 and may be, for example, a server, a desktop computer, a laptop computer, a tablet computer, a personal digital assistant (PDA), a smart phone, a thin client or any other electronic device or computing system capable of communicating with tape virtualization engine 104 through network 102. For example, client computer 106 and client computer 108 may be a laptop computer capable of connecting to a network, such as network 102, to submit one or more data queries to a central server to utilize a software-based program, such as adjustable tape program 112 of tape virtualization engine 104. In one embodiment, client computer 106 and client computer 108 may be any suitable type of client device capable of submitting one or more read or write requests to a data tape management server, such as tape virtualization engine 104. In one embodiment, client computer 106 and client computer 108 include a user interface (not shown) for submitting data requests to a data tape management server, such as tape virtualization engine 104. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels or text navigation. In computers, GUIs were introduced in reaction to the perceived steep learning curves of command-line interfaces, which required commands to be typed on the keyboard. The actions in GUIs are often performed through direct manipulation of the graphics elements.

In one embodiment, tape library 110 is a tape storage library interconnected with a tape virtualization mainframe, such as tape virtualization engine 104. In one embodiment, tape library 110 provides the capability to store data through the use of an integrated tape drive and one or more physical tapes. In one embodiment, tape library 110 may represent a plurality of interconnected physical tape libraries.

Figure 2:
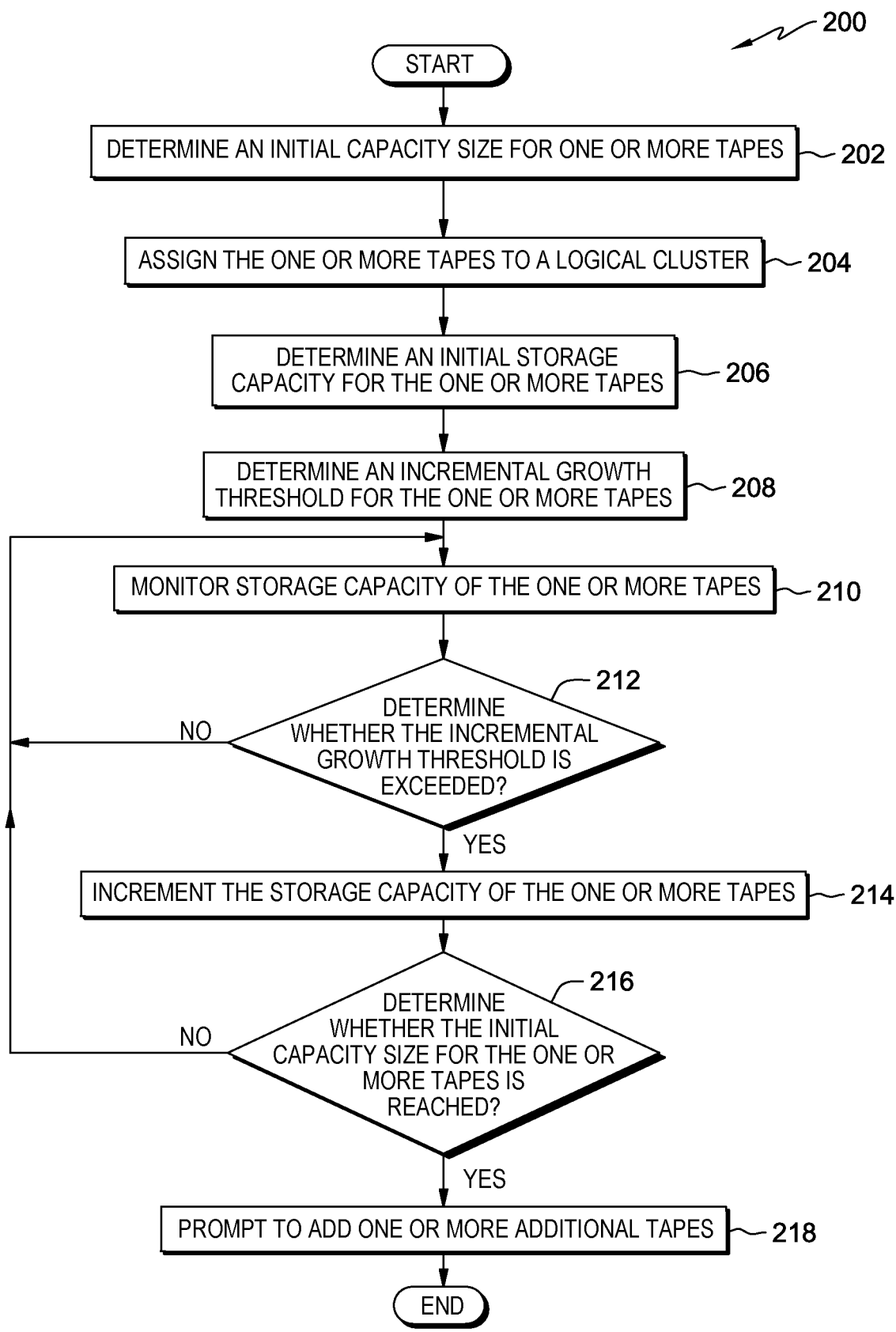
FIG. 2 is a flowchart depicting operational steps of an adjustable tape program, in accordance with an embodiment of the present invention.

FIG. 2 depicts a flowchart of operational steps of an adjustable tape program, such as adjustable tape program 112 of FIG. 1, generally designated 200, for adjusting available physical tape storage capacities based on predetermined storage policies, in accordance with an embodiment of the present invention.

Adjustable tape program 112 determines an initial capacity size for one or more tapes (202). In one embodiment, responsive to a tape virtualization mainframe, such as tape virtualization engine 104, receiving a request from a host computer, such as client computer 106 and client computer 108, to purchase, update, add or modify one or more tape storage media (e.g., physical tapes, long cartridges, short cartridges, etc.), adjustable tape program 112 determines an initial capacity size for the one or more tapes by retrieving physical tape information and specifications from a tape library housing the one or more tapes, such as tape library 110, where the initial capacity size is a maximum physical storage capacity provided by the one or more tapes. For example, adjustable tape program 112 may retrieve information about the one or more physical tapes from a tape library, where the information includes at least a model (i.e., a type) of the one or more physical tapes and a maximum physical storage capacity of the one or more physical tapes, such as a long cartridge tape with a maximum physical storage capacity of 10 TB. In one embodiment, adjustable tape program 112 determines the initial capacity size of the one or more tapes to be the maximum physical storage capacity provided by the one or more tapes. For example, where the maximum physical storage capacity of a physical tape is 10 TB, adjustable tape program 112 determines the initial capacity size for the physical tape to be 10 TB.

Adjustable tape program 112 assigns the one or more tapes to a logical cluster (204). In one embodiment, adjustable tape program 112 assigns the one or more tapes to a logical cluster based, at least in part, on the initial capacity size for the one or more tapes. In one embodiment, adjustable tape program 112 may utilize the determination of initial capacity size for the one or more tapes to handle the one or more tapes on a per pool basis (i.e., one or more pools consisting of a plurality of logical tapes representing the one or more tapes), assigning the one or more tapes to a logical cluster, such that, for example, a plurality of physical tapes having an initial capacity size of 10 TB may be handled as a first pool of logical tapes assigned to a first logical cluster, a plurality of tapes having an initial capacity size of 5 TB may be handled as a second pool of logical tapes assigned to a second logical cluster and so on. In another embodiment, adjustable tape program 112 may assign the one or more tapes individually or in a per pool basis, to a logical cluster independent of their respective initial capacity size. In another embodiment, adjustable tape program 112 may assign each of the one or more tapes to a respective logical cluster. In one embodiment, adjustable tape program 112 may assign the one or more tapes to one or more logical clusters based, at least in part, on data storage demands or requirements of a customer. In another embodiment, adjustable tape program 112 may assign the one or more tapes to one or more logical clusters based, at least in part, on a volume of data being stored, as well as a type of data being stored (e.g., active, inactive, high priority, low priority, readily accessible, archive, etc.).

Adjustable tape program 112 determines an initial storage capacity for the one or more tapes (206). In one embodiment, adjustable tape program 112 determines an initial storage capacity for the one or more tapes in the logical cluster based, at least in part, on one or more predefined storage policies, where the initial storage capacity is a starting logical storage capacity for the one or more tapes and where the one or more predefined storage policies include one or more conditions for handling storage growth and storage demands and a desired starting logical storage capacity for the one or more tapes. In one embodiment, the desired starting logical storage capacity may be a user defined starting logical storage capacity that is less than the maximum physical storage capacity for the one or more tapes. For example, adjustable tape program 112 may determine an initial storage capacity of 2 TB for one or more physical tapes having a maximum physical storage capacity of 10 TB based, at least in part, on one or more predefined storage policies that state a user desired starting logical storage capacity be 20 percent of the maximum physical storage capacity of the one or more tapes. In one embodiment, the desired starting logical storage capacity may be a percentage of the maximum physical storage capacity of the one or more tapes, where the percentage satisfies data storage demands of a user, while still providing expeditious read and write (i.e., seek and mount) times. In one embodiment, adjustable tape program 112 may determine a starting logical storage capacity for the one or more tapes based, at least in part, on a level of performance with regard to read and write times demanded by a user, dictated by a type of data being stored or dictated by the logical cluster that the one or more tapes are assigned to, etc. In another embodiment, adjustable tape program 112 may determine the starting logical storage capacity for the one or more tapes based, at least in part, on an on demand pricing plan. For example, where a customer may pay for 2 TB of storage volume on a 10 TB physical tape, with an option to increase usable space of the physical tape as needed, adjustable tape program 112 may determine the starting logical storage capacity of the physical tape to be 2 TB.

Adjustable tape program 112 determines an incremental growth threshold for the one or more tapes (208). In one embodiment, adjustable tape program 112 determines an incremental growth threshold for the one or more tapes in the logical cluster based, at least in part, on one or more predefined storage policies, where the one or more predefined storage policies include one or more conditions for handling storage growth and storage demands and a desired incremental growth threshold for the one or more tapes. In one embodiment, the desired incremental growth threshold may include a user defined logical storage capacity volume, which when reached, triggers an incremental growth assignment, where the incremental growth assignment functions to increase the logical storage capacity of the one or more tapes by a predetermined storage volume. For example, adjustable tape program 112 may determine a starting logical storage capacity of 2 TB for one or more physical tapes having a maximum physical storage capacity of 10 TB and based, at least in part, on one or more predefined storage policies that state a user desired incremental growth threshold to be 20 percent of the maximum physical capacity of the one or more tapes, adjustable tape program 112 may determine the incremental growth threshold to be 2 TB of storage capacity. In one embodiment, the desired incremental growth threshold may mirror the maximum physical capacity of the one or more tapes, or may be a percentage of the maximum physical capacity of the one or more tapes, where the percentage satisfies growing data storage demands of a user, while still providing expeditious read and write (i.e., seek and mount) times. In one embodiment, adjustable tape program 112 may determine an incremental growth threshold for the one or more tapes based, at least in part, on a level of performance with regard to read and write times demanded by a user, dictated by a type of data being stored, or dictated by the logical cluster that the one or more tapes are assigned to, etc. In another embodiment, adjustable tape program 112 may determine the incremental growth threshold for the one or more tapes based, at least in part, on an on demand pricing plan. For example, where a customer may initially pay for 2 TB of storage volume on a 10 TB physical tape, then later selects an option to increase usable space of the physical tape to 4 TB, adjustable tape program 112 may determine the incremental growth threshold of the physical tape to be 2 TB. In one embodiment, adjustable tape program 112 may determine an incremental growth assignment similarly to the incremental growth threshold. In one embodiment, adjustable tape program 112 may determine the incremental growth assignment as any increment in storage volume up to the maximum physical capacity of the one or more tapes.

Adjustable tape program 112 monitors storage capacity of the one or more tapes (210). In one embodiment, adjustable tape program 112 continuously monitors the storage capacity of the one or more tapes as data stored within the initial storage capacity of the one or more tapes, where monitoring includes gathering data storage usage information from the one or more tapes. In one embodiment, data storage usage information may include a volume of storage remaining from the starting logical storage capacity, a type of data (e.g., active, inactive, etc.) stored in the one or more tapes, a frequency of read and write operations, a time needed to perform read and write operations, a distribution of data volume across the one or more tapes, a volume of storage remaining until the incremental growth threshold is exceeded and a number of potential incremental growth assignments remaining until the maximum physical capacity of the one or more tapes is reached.

Adjustable tape program 112 determines whether the incremental growth threshold is exceeded (212). In one embodiment, adjustable tape program 112 determines whether the incremental growth threshold is exceeded by monitoring data storage usage information, such as a volume of logical storage remaining until the incremental growth threshold is exceeded. Where the volume of data in the one or more tapes reach the starting logical storage capacity for the one or more tapes or a pending data write operation would place the volume of data in the one or more tapes in excess of the starting logical storage capacity, adjustable tape program 112 determines the incremental growth threshold is exceeded. Where the volume of data in the one or more tapes does not reach the starting logical storage capacity for the one or more tapes and additional data write operations would not place the volume of data in the one or more tapes in excess of the starting logical storage capacity, adjustable tape program 112 determines the incremental growth threshold is not exceeded.

Responsive to a determination that the incremental growth threshold is not exceeded (NO branch, 212), adjustable tape program 112 continues to monitor storage capacity of the one or more tapes (210).

Responsive to a determination that the incremental growth threshold is exceeded (YES branch, 212), adjustable tape program 112 increments the logical storage capacity of the one or more tapes (214). In one embodiment, adjustable tape program 112 increments the logical storage capacity of the one or more tapes by the incremental growth assignment. For example, where the starting logical storage capacity of 2 TB for the one or more tapes is exceeded, adjustable tape program 112 increments the logical storage capacity of the one or more tapes by the incremental growth assignment, such as 2 TB, thereby increasing the logical storage capacity by 2 TB to a revised incremental growth threshold of 4 TB.

Adjustable tape program 112 determines whether the initial capacity size for the one or more tapes is reached (216). In one embodiment, adjustable tape program 112 determines whether the maximum physical capacity for the one or more tapes is reached by monitoring the data storage information, such as a volume of logical storage remaining until the revised incremental growth threshold is exceeded and a number of potential incremental growth assignments remaining until the maximum physical capacity of the one or more tapes is reached. Where no volume of logical storage remains on the one or more tapes or there are no remaining growth assignments until the maximum physical capacity of the one or more tapes is reached, adjustable tape program 112 determines that the initial capacity size of the one or more tapes is reached. Where some volume of logical storage remains on the one or more tapes and there are a number of potential remaining growth assignments until the maximum physical capacity size of the one or more tapes is reached, adjustable tape program 112 determines that the initial capacity size of the one or more tapes is not yet reached.

Responsive to a determination that the initial capacity size of the one or more tapes is not yet reached (NO branch, 216), adjustable tape program 112 continues to monitor storage capacity of the one or more tapes (210).

Responsive to a determination that the initial capacity size of the one or more tapes is reached (YES branch, 216), adjustable tape program 112 prompts to add one or more additional tapes (218). In one embodiment, adjustable tape program 112 may prompt a user (e.g., customer) to add one or more additional physical tapes to the tape library, such as tape library 110, in order to meet data storage growth demands. In another embodiment, adjustable tape program 112 may prompt a user to purchase additional logical storage for the one or more tapes via variable on demand pricing, such that additional logical storage on an existing physical tape could be purchased to increase the usable physical space of the volume without the need to purchase or add the additional one or more tapes. In yet another embodiment, adjustable tape program 112 may initiate a reclaim operation (i.e., remove, delete, relocate data) in order to purge inactive data from the one or more tapes. Where a data is removed from the one or more tapes, and physical data storage volume is restored to the one or more tapes, adjustable tape program 112 may reset the logical storage capacity for the one or more tapes to the starting logical storage capacity, and further repeating steps 206 through 218.

Figure 3:
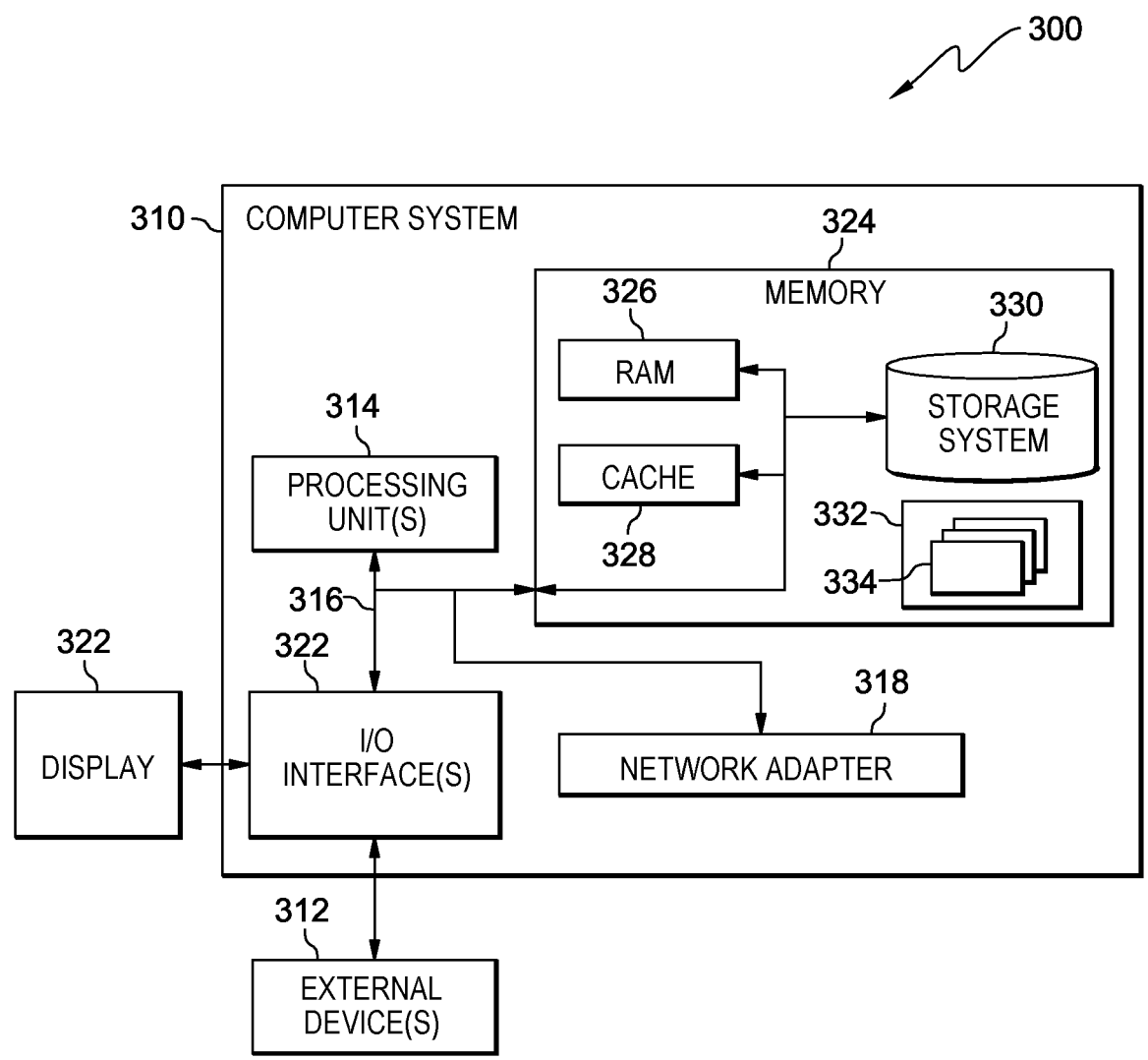
FIG. 3 is a block diagram depicting components of a data processing system (such as the tape virtualization engine of FIG. 1), in accordance with an embodiment of the present invention.

FIG. 3 depicts a block diagram of components of data processing system, such as tape virtualization engine 104 of FIG. 1, generally designated 300, in accordance with an illustrative embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, tape virtualization engine 104 in data processing environment 100 is shown in the form of a general-purpose computing device, such as computer system 310. The components of computer system 310 may include, but are not limited to, one or more processors or processing unit(s) 314, memory 324 and bus 316 that couples various system components including memory 324 to processing unit(s) 314.

Bus 316 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus and Peripheral Component Interconnect (PCI) bus.

Computer system 310 typically includes a variety of computer system readable media. Such media may be any available media that is accessible by computer system 310 and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example and not limitation, as well as an operating system, one or more application programs, other program modules and program data. Each of the operating systems, one or more application programs, other program modules and program data or some combination thereof, may include an implementation of a networking environment. Program modules 334 generally carry out the functions and/or methodologies of embodiments of the invention as described herein. Computer system 310 may also communicate with one or more external device(s) 312, such as a keyboard, a pointing device, a display 322, etc. or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks, such as a local area network (LAN), a general wide area network (WAN) and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives and data archival storage systems may be used in conjunction with computer system 310.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for improving physical tape storage management by adjusting available physical tape storage capacities based on predefined storage policies, the method comprising: determining, by one or more computer processors, an initial capacity size for one or more tapes, wherein the initial capacity size is a maximum physical storage capacity provided by the one or more tapes; assigning, by the one or more computer processors, the one or more tapes to a logical cluster on a per pool basis based, at least in part, on customer data storage demands, a type of data being stored, a volume of data being stored, and the initial capacity size for the one or more tapes; determining, by the one or more computer processors, an initial storage capacity for the one or more tapes, wherein the initial storage capacity is a starting logical storage capacity that is less than the maximum physical storage capacity provided by the one or more tapes, and temporarily marking the one or more tapes as full at the starting logical storage capacity to expedite mount and seek times; determining, by the one or more computer processors, an incremental growth threshold for the one or more tapes, wherein the incremental growth threshold is a predetermined storage volume equal to a percentage of the maximum physical storage capacity provided by the one or more tapes; responsive to a determination that the incremental growth threshold is exceeded, incrementing, by the one or more computer processors, the starting logical storage capacity of the one or more tapes by an incremental growth assignment up to the maximum physical storage capacity provided by the one or more tapes, and marking the one or more tapes as full at a storage volume equal to the starting logical storage capacity plus the incremental growth assignment, wherein the incremental growth assignment is an increment in the storage volume of the one or more tapes up to the maximum physical storage capacity provided by the one or more tapes; and responsive to a determination that the maximum physical storage capacity provided by the one or more tapes is reached, prompting, by the one or more computer processors, a user to initiate a reclaim operation to purge inactive data from the one or more tapes, wherein the reclaim operation is a storage condition that when initiated restores the physical storage capacity volume to the one or more tapes, and resets the starting logical storage capacity of the one or more tapes as full at a second storage volume, wherein the second storage volume is based on the storage condition and the starting logical storage capacity is equal to a second percentage of the maximum physical storage capacity of the one or more tapes.

2. The method of claim 1, wherein determining an initial capacity size for one or more tapes further comprises:
  retrieving, by the one or more computer processors, a plurality of physical tape information for the one or more tapes, wherein the plurality of physical tape information includes at least a model type of the one or more tapes and the maximum physical storage capacity provided by the one or more tapes.

3. The method of claim 1, wherein determining an incremental growth threshold for the one or more tapes further comprises:
  determining, by the one or more computer processors, the incremental growth threshold for the one or more tapes based, at least in part, one or more predefined storage policies, wherein the one or more predefined storage policies include one or more conditions for handling storage growth and storage demands.

4. The method of claim 3, wherein the one or more conditions include at least a predefined storage capacity volume, which when reached, triggers the incremental growth assignment, wherein the incremental growth assignment functions to increase the logical storage capacity of the one or more tapes by a predetermined storage volume.

5. The method of claim 1, where incrementing a logical storage capacity of the one or more tapes by an incremental growth assignment further comprises:
determining, by the one or more computer processors, the incremental growth threshold is exceeded where a volume of data in the one or more tapes reaches the starting logical storage capacity for the one or more tapes.

6. A computer program product for improving physical tape storage management by adjusting available physical tape storage capacities based on predefined storage policies, the computer program product comprising: one or more computer readable storage media and program instructions stored on the one or more computer readable storage media, the program instructions comprising: program instructions to determine an initial capacity size for one or more tapes, wherein the initial capacity size is a maximum physical storage capacity provided by the one or more tapes; program instructions to assign the one or more tapes to a logical cluster on a per pool basis based, at least in part, on customer data storage demands, a type of data being stored, a volume of data being stored, and the initial capacity size for the one or more tapes; program instructions to determine an initial storage capacity for the one or more tapes, wherein the initial storage capacity is a starting logical storage capacity that is less than the maximum physical storage capacity provided by the one or more tapes, and temporarily marking the one or more tapes as full at the starting logical storage capacity to expedite mount and seek times; program instructions to determine an incremental growth threshold for the one or more tapes, wherein the incremental growth threshold is a predetermined storage volume equal to a percentage of the maximum physical storage capacity provided by the one or more tapes; responsive to a determination that the incremental growth threshold is exceeded, program instructions to increment the starting logical storage capacity of the one or more tapes by an incremental growth assignment up to the maximum physical storage capacity provided by the one or more tapes, and marking the one or more tapes as full at a storage volume equal to the starting logical storage capacity plus the incremental growth assignment, wherein the incremental growth assignment is an increment in the storage volume of the one or more tapes up to the maximum physical storage capacity provided by the one or more tapes; and responsive to a determination that the maximum physical storage capacity provided by the one or more tapes is reached, program instructions to prompt a user to initiate a reclaim operation to purge inactive data from the one or more tapes, wherein the reclaim operation is a storage condition that when initiated restores the physical storage capacity volume to the one or more tapes, and resets the starting logical storage capacity of the one or more tapes as full at a second storage volume, wherein the second storage volume is based on the storage condition and the starting logical storage capacity is equal to a second percentage of the maximum physical storage capacity of the one or more tapes.

7. The computer program product of claim 6, wherein program instructions to determine an initial capacity size for one or more tapes further comprise:
program instructions to retrieve a plurality of physical tape information for the one or more tapes, wherein the plurality of physical tape information includes at least a model type of the one or more tapes and the maximum physical storage capacity provided by the one or more tapes.

8. The computer program product of claim 6, wherein program instructions to determine an incremental growth threshold for the one or more tapes further comprise:
program instructions to determine the incremental growth threshold for the one or more tapes based, at least in part, one or more predefined storage policies, wherein the one or more predefined storage policies include one or more conditions for handling storage growth and storage demands.

9. The computer program product of claim 8, wherein the one or more conditions include at least a predefined storage capacity volume, which when reached, triggers the incremental growth assignment, wherein the incremental growth assignment functions to increase the logical storage capacity of the one or more tapes by a predetermined storage volume.

10. The computer program product of claim 6, where program instructions to increment a logical storage capacity of the one or more tapes by an incremental growth assignment further comprise:
program instructions to determine the incremental growth threshold is exceeded where a volume of data in the one or more tapes reaches the starting logical storage capacity for the one or more tapes.

11. A computer system for improving physical tape storage management by adjusting available physical tape storage capacities based on predefined storage policies, the computer system comprising: one or more computer processors; one or more computer readable storage media; and program instructions stored on at least one of the one or more computer readable storage media for execution by at least one of the one or more computer processors, the program instructions comprising: program instructions to determine an initial capacity size for one or more tapes, wherein the initial capacity size is a maximum physical storage capacity provided by the one or more tapes; program instructions to assign the one or more tapes to a logical cluster on a per pool basis based, at least in part, on customer data storage demands, a type of data being stored, a volume of data being stored, and the initial capacity size for the one or more tapes; program instructions to determine an initial storage capacity for the one or more tapes, wherein the initial storage capacity is a starting logical storage capacity that is less than the maximum physical storage capacity provided by the one or more tapes, and temporarily marking the one or more tapes as full at the starting logical storage capacity to expedite mount and seek times; program instructions to determine an incremental growth threshold for the one or more tapes, wherein the incremental growth threshold is a predetermined storage volume equal to a percentage of the maximum physical storage capacity provided by the one or more tapes; responsive to a determination that the incremental growth threshold is exceeded, program instructions to increment the starting logical storage capacity of the one or more tapes by an incremental growth assignment up to the maximum physical storage capacity provided by the one or more tapes, and marking the one or more tapes as full at a storage volume equal to the starting logical storage capacity plus the incremental growth assignment, wherein the incremental growth assignment is an increment in the storage volume of the one or more tapes up to the maximum physical storage capacity provided by the one or more tapes; and responsive to a determination that the maximum physical storage capacity provided by the one or more tapes is reached, program instructions to prompt a user to initiate a reclaim operation to purge inactive data from the one or more tapes, wherein the reclaim operation is a storage condition that when initiated restores the physical storage capacity volume to the one or more tapes, and resets the starting logical storage capacity of the one or more tapes as full at a second storage volume, wherein the second storage volume is based on the storage condition and the starting logical storage capacity is equal to a second percentage of the maximum physical storage capacity of the one or more tapes.

12. The computer system of claim 11, wherein program instructions to determine an initial capacity size for one or more tapes further comprise:
   program instructions to retrieve a plurality of physical tape information for the one or more tapes, wherein the plurality of physical tape information includes at least a model type of the one or more tapes and the maximum physical storage capacity provided by the one or more tapes.

13. The computer system of claim 11, wherein program instructions to determine an incremental growth threshold for the one or more tapes further comprise:
   program instructions to determine the incremental growth threshold for the one or more tapes based, at least in part, one or more predefined storage policies, wherein the one or more predefined storage policies include one or more conditions for handling storage growth and storage demands.

14. The computer system of claim 13, wherein the one or more conditions include at least a predefined storage capacity volume, which when reached, triggers the incremental growth assignment, wherein the incremental growth assignment functions to increase the logical storage capacity of the one or more tapes by a predetermined storage volume.

\* \* \* \* \*